Patented Oct. 10, 1933

1,930,393

UNITED STATES PATENT OFFICE 1,930,393

ADHESIVE TO BE EMPLOYED IN THE MANUFACTURE OF WATERPROOF ABRASIVE PRODUCTS

Jacques Lemerle, Paris, France, assignor to Societe Anonyme, Compagnie Centrale des Emeris et Produits a Polir, Paris, France No Drawing. Application October 21, 1929, Serial No. 401,375, and in France October 25, 1928

1 Claim. (Cl. 87—17)

The present invention relates to a special cement consisting chiefly of drying oil and asphalt or bitumen, which becomes waterproof after hardening, and which, although well adapted for general uses such as the waterproofing of fabrics, paper, or wood, or for the adhesion of powder or granular substances to a backing which is not of an oily nature, is principally employed for the obtainment of abrasive substances of a waterproof nature.

The said adhesive substance or cement according to the invention consists essentially of a mixture, used in suitable proportions and heated in determined conditions, of drying oil and asphalt or bitumen, together with oxidizing agents. The term drying oil refers to linseed oil, oil of China wood, of the oelecocca, or the like, or a mixture of such oils. The oxidizing agents may consist of mineral matter such as ultramarine blue, Prussian blue, umber, green earth, or the like, or of any other substance adapted for the oxidation of oils, such as salts of lead, of manganese, of iron, or finally of all commercial products serving the same purpose. The oxidation may also be effected by any of the known methods such as the bubbling of pure or ozonized air, by dropping upon fabrics or suitable surfaces, by passing ultra-violet rays through the material, etc.

The following composition is given for the said adhesive substance or cement:

|                          | Parts |
|--------------------------|-------|
| Drying oil               | 1000  |
| Prussian blue            | 50    |
| Umber                    | 15    |
| Green earth              | 10    |
| Asphalt or bitumen       | 40    |

The said cement may be prepared as follows:

The drying oil, either in the raw state or slightly boiled, and optionally bleached and purified from grease is gradually heated to 135–150° C. Then add in small quantities the blue substance and the umber and green earth, in the powdered state. Heat to 245°, stirring the while. Then add the bitumen and the asphalt, and now heat to 260–270° C. This temperature is maintained until the substance shows the proper viscosity, as can be tested by taking out samples towards the end of the heating.

The duration of the heating will depend upon the degree of the viscosity or siccative value desired, and it may last for several days when treating large quantities.

The aforesaid proportions of the constituents, and the order of their introduction, as well as all temperatures, are not of a limitative nature. For instance if it is desired to obtain a cement of a flexible nature having but little tenacity, it is necessary to reduce the amount of bitumen or asphalt, but for the obtainment of a cement which is very hard and is quite siccative, this amount is to be increased, as well as the proportion of the umber and green earth.

For the proper hardening of the cement, the surfaces to be coated must be quite freed from grease, and the backing is then coated with the cement, that is, wood, paper, cloth, films, rubber, sheet metal, etc. and the whole is then placed in a drying apparatus or room which is maintained at a temperature of 80° C. for a time depending directly upon the thickness of the layer of cement, and inversely upon the selected temperature.

The said cement may be hardened at the ordinary temperature by ultra-violet rays, ozonized air, or by a combination of the means above specified.

The said cement, which may serve for the coating of all of the aforesaid substances, may be employed alone or mixed with a suitable coloring matter or pigment.

However, the said cement is chiefly employed for the obtainment of abrasive products which will preserve their solidity and their abrasive properties in the presence of water, and for this reason they are well adapted for use in the presence of water.

The said abrasive products can be obtained by spreading upon a suitable backing such as paper, wood, cloth, films, etc., which have been made waterproof by suitable means, an intimate mixture of abrasive grains with the said cement; or a layer of cement may be coated upon the backing, then adding the said grains of abrasive substance by a suitable powdering process. The cement layer is then hardened by any of the aforesaid means.

To facilitate the use of the said cement, it may be advisable to dilute it with a known volatile solvent, such as turpentine, benzine, white spirit, benzol, etc.

In certain cases, an outer coating of the cement may be applied, by spreading upon the abrasive substance a thin layer of the cement, optionally diluted, then finishing the operation in the same manner as specified for the cementing.

It may also be required to use several superposed layers of the cement, in which case each layer is to be properly hardened before applying the next layer.

I claim:

An adhesive composition consisting essentially of a mixture of drying oil and bitumen containing about four percent of the bitumen relative to the drying oil, the drying oil being oxidized.

JACQUES LEMERLE.